United States Patent
Slawinski et al.

(10) Patent No.: US 9,321,188 B2
(45) Date of Patent: Apr. 26, 2016

(54) METHOD FOR MANUFACTURING OF CERAMIC ELECTRO-INSULATING PIPES

(71) Applicant: INDUSTRY TECHNOLOGIES S.A., Lubsko (PL)

(72) Inventors: Artur Slawinski, Warszawa (PL); Joachim Summerer, Selb, DE (US)

(73) Assignee: INDUSTRY TECHNOLOGIES S.A, Lussko (PL)

( * ) Notice: Subject to any disclaimer, the term of this patent is extended or adjusted under 35 U.S.C. 154(b) by 71 days.

(21) Appl. No.: 14/411,387

(22) PCT Filed: Jun. 25, 2013

(86) PCT No.: PCT/PL2013/050013
§ 371 (c)(1),
(2) Date: Dec. 25, 2014

(87) PCT Pub. No.: WO2014/003587
PCT Pub. Date: Jan. 3, 2014

(65) Prior Publication Data
US 2015/0197035 A1 Jul. 16, 2015

(30) Foreign Application Priority Data

Jun. 27, 2012 (PL) .......................................... 399697
Aug. 9, 2012 (PL) .......................................... 400313

(51) Int. Cl.
*B28B 21/16* (2006.01)
*B28B 3/00* (2006.01)
(Continued)

(52) U.S. Cl.
CPC ................. *B28B 21/16* (2013.01); *B28B 3/003* (2013.01); *B28B 13/02* (2013.01); *B30B 11/001* (2013.01); *C04B 35/111* (2013.01); *C04B 35/18* (2013.01); *C04B 2235/349* (2013.01); *C04B 2235/3418* (2013.01)

(58) Field of Classification Search
CPC ...... B28B 3/003; B28B 11/001; B28B 13/02; B28B 21/16; C04B 35/111; C04B 35/18
USPC .......................................................... 264/667
See application file for complete search history.

(56) References Cited

U.S. PATENT DOCUMENTS 3,239,591 A 3/1966 Wendt
4,938,673 A 7/1990 Adrian

FOREIGN PATENT DOCUMENTS

CN 102431086 5/2012
DE 2803418 8/1978
(Continued)

*Primary Examiner* — Russell Kemmerle, III
(74) *Attorney, Agent, or Firm* — Mark M. Friedman

(57) ABSTRACT

A method for manufacturing of ceramic electro-insulating pipes having an external diameter between 30 mm and 100 mm, a wall thickness between 5 mm and 10 mm, a length between 15 cm and 150 cm, the method comprising molding in a mold, an element made from a ceramic powder, compacting the ceramic element in a press, glazing, firing of a glazed element in a furnace and shaping the fired element in order to produce the ceramic insulating pipe characterized in that the element is molded in a mould (102) from a ceramic powder consisting of $Al_2O_3$ from 40% to 75% by weight, $SiO_2$ from 5 to 25%, kaolin (white clay) from 5% to 20%, and potter's clay from 5% to 20%, wherein the mold (102) comprises a rigid cylindrical lower punch (202) and a flexible cylindrical outer membrane (203) placed around the lower punch (202) so that between them a cylindrical gap (204) is formed to be filled with the ceramic powder, wherein while filling the gap (204) with the ceramic powder, the outer membrane (203) is deformed from a circular cross-section to an oval cross-section with the use of at least one pair of vibrators (211-212; 213-214) positioned on the opposite sides of the membrane (203) and operating in at least three stages, in which the vibration frequency increases and the amplitude of vibration decreases between successive stages, wherein the lowest vibration frequency is between 50 Hz and 70 Hz, and the highest vibration frequency is between 90 Hz and 110 Hz, and wherein the vibration amplitude causes a reduction of the diameter of membrane between the vibrators from the lowest value of about 0.5% to the highest value of about 2%, wherein the filled mould (102) is placed in the isostatic press in order to compact the element, wherein the membrane (203) of the mould is pressed isostatically in a first cycle that lasts from 15 s to 25 s, in which the pressure is linearly increased from 1 bar up to a value between 300 bar and 800 bar, a second cycle which lasts about 1 s, in which the pressure is maintained at the level reached so far, and in a third cycle that lasts from 25 s to 35 s, wherein the pressure is reduced linearly to 1 bar, resulting in forming an element having a porosity of below 20%.

1 Claim, 3 Drawing Sheets

(51) Int. Cl.
   *B28B 13/02* (2006.01)
   *B30B 11/00* (2006.01)
   *C04B 35/111* (2006.01)
   *C04B 35/18* (2006.01)

(56) References Cited

FOREIGN PATENT DOCUMENTS

| RU | 2318657 | 3/2008 |
|----|---------|--------|
| WO | 2011106232 | 9/2011 |

METHOD FOR MANUFACTURING OF CERAMIC ELECTRO-INSULATING PIPES

TECHNICAL FIELD

The present invention relates to a method for manufacturing of ceramic electro-insulating pipes.

BACKGROUND ART

A PCT application WO2011106232 shows a typical way of manufacturing a ceramic element that includes mixing a pre-mixture with other components in order to obtain a batch mixture containing a cellulose ingredient and an aluminium component; the addition of liquid to the batch mixture in order to form the batch; shaping the batch to a form of body; firing the shaped body in order to form the ceramic element. This typical way has certain defects, for example the inaccuracies resulting from shaping the body under a relatively low pressure and relatively large dimensions of the shaped element in order to ensure appropriate electro-insulating properties.

Recently, there has been developed a technology of isostatic pressing that enables to shape ceramic elements effectively. It consists in treating a ceramic mixture under isostatic pressure in a chamber with a liquid under high pressure. The pressure is exerted on the material from all directions.

A U.S. Pat. No. 4,938,673 describes hot isostatic pressing, wherein an element is prepared from a mixture containing a powdered coupled and a first powdered insulator, and after that the element is immersed in a second powdered insulator in a compressible container, and then the element is placed inside a pressurized vessel to which a microwave energy is supplied to raise a temperature of the element, and then the element is compressed by using a liquid medium supplied under pressure.

The technology of isostatic pressing of ceramic elements has been applied so far for relatively large components, such as ceramic chimneys that require a moderate dimensional accuracy.

A Russian patent document RU2318657 presents a method for manufacturing of a ceramic insulator. This insulator is a solid element. In this method, a mould is filled with a ceramic powder and, while filling, the vibrations of the whole mould are induced. Then the mould is closed and pressed to achieve porosity of the finished element at the level of 20-36%. This process has several disadvantages. First, the produced elements are solid elements and not pipes, therefore they have large mass and are fairly expensive to manufacture. The final, relatively high porosity of up to 36% induces large dimensional inaccuracies when fired and thus the produced element requires additional mechanical treatment by using costly diamond tools in order to obtain the desired dimensional tolerance. In addition, vibrations of the whole mould require high power vibrators.

DISCLOSURE OF THE INVENTION

The purpose of the present invention is to provide an alternative way of moulding ceramic electro-insulating pipes in order to achieve even greater dimensional accuracy and better electro-insulating properties.

The object of this invention is a method for manufacturing of ceramic electro-insulating pipes having an external diameter between 30 mm and 100 mm, a wall thickness between 5 mm and 10 mm, a length between 15 cm and 150 cm, the method comprising moulding in a mould, an element made from a ceramic powder, compacting the ceramic element in a press, glazing, firing of a glazed element in a furnace and shaping the fired element in order to produce the ceramic insulating pipe characterised in that the element is moulded in a mould (102) from a ceramic powder consisting of $Al_2O_3$ from 40% to 75% by weight, $SiO_2$ from 5 to 25%, kaolin (white clay) from 5% to 20%, and potter's clay from 5% to 20%, wherein the mould comprises a rigid cylindrical lower punch and a flexible cylindrical outer membrane placed around the lower punch so that between them a cylindrical gap is formed to be filled with the ceramic powder, wherein while filling the gap with the ceramic powder, the outer membrane is deformed from a circular cross-section to an oval cross-section with the use of at least one pair of vibrators positioned on the opposite sides of the membrane and operating in at least three stages, in which the vibration frequency increases and the amplitude of vibration decreases between successive stages, wherein the lowest vibration frequency is between 50 Hz and 70 Hz, and the highest vibration frequency is between 90 Hz and 110 Hz, and wherein the vibration amplitude causes a reduction of the diameter of membrane between the vibrators from the lowest value of about 0.5% to the highest value of about 2%, wherein the filled mould is placed in the isostatic press in order to compact the element, wherein the membrane of the mould is pressed isostatically in a first cycle that lasts from 15 s to 25 s, in which the pressure is linearly increased from 1 bar up to a value between 300 bar and 800 bar, a second cycle which lasts about 1 s, in which the pressure is maintained at the level reached so far, and in a third cycle that lasts from 25 s to 35 s, wherein the pressure is reduced linearly to 1 bar, resulting in forming an element having a porosity of below 20%.

The present invention is distinguished from the closest prior art, which is considered to be the Russian patent document RU2318657, in that it enables to manufacture ceramic pipes, but not solid elements, of a lower porosity when fired, which they require mechanical treatment after to the less extent in order to achieve the desired dimensional accuracy. In this invention, the mould is not vibrated as a whole, but the vibration is applied pointwise on the flexible outer walls with the use of a set of vibrators spaced on the outside of the mould and controlled by stages with the decreasing vibration frequency in successive stages, by which the energy consumption for vibrations is optimised. The use of effective vibration method enables to compact effectively the mass, which in conjunction with high pressing pressure provides porosity of moulded pipe elements at a level below 20%.

The use of the way according to this invention enables to manufacture ceramic insulating pipes of a high quality, mainly resulting from a high dimensional accuracy. The dimensional accuracy reduces the amount of defected elements to a level below 4% of the total output. The high level of mass compaction in the process of isostatic pressing provides porosity of moulded elements below 20% and enables to reduce the wall thickness of pipes by about 10-15% compared with standard elements. Ceramic pipes manufactured according to this invention are also characterised by a higher strength measured as a lateral crushing force by about 10% as compared with standard elements owing to the higher density and thinner pipe wall. The reduced wall thickness also results in weight reduction of the pipe element by about 10-15%. In addition, the method according to the present invention eliminates the need to dry moulded elements since the elements compressed isostatically have a certain moisture content, which increases the energetic efficiency of the whole process.

BRIEF DESCRIPTION OF DRAWINGS

The present invention is shown by means of an exemplary embodiment on a drawing, in which.

MODES FOR CARRYING OUT THE INVENTION

Figure 1:
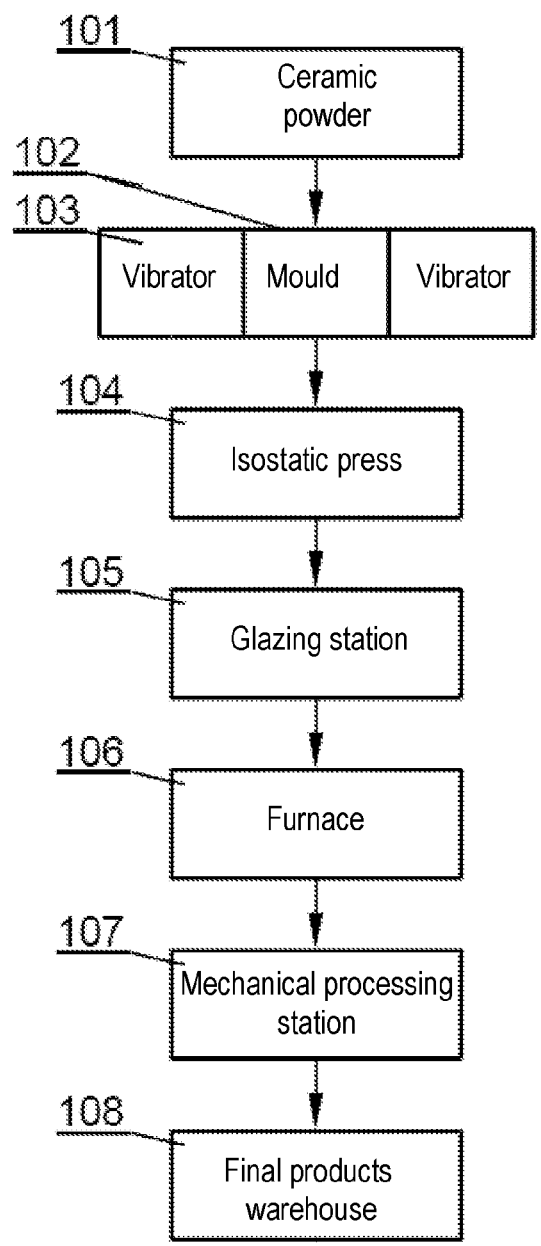
FIG. 1 presents a schematic diagram of a technological line to manufacture electro-insulating ceramic pipes according to the invention.
Figure 2:
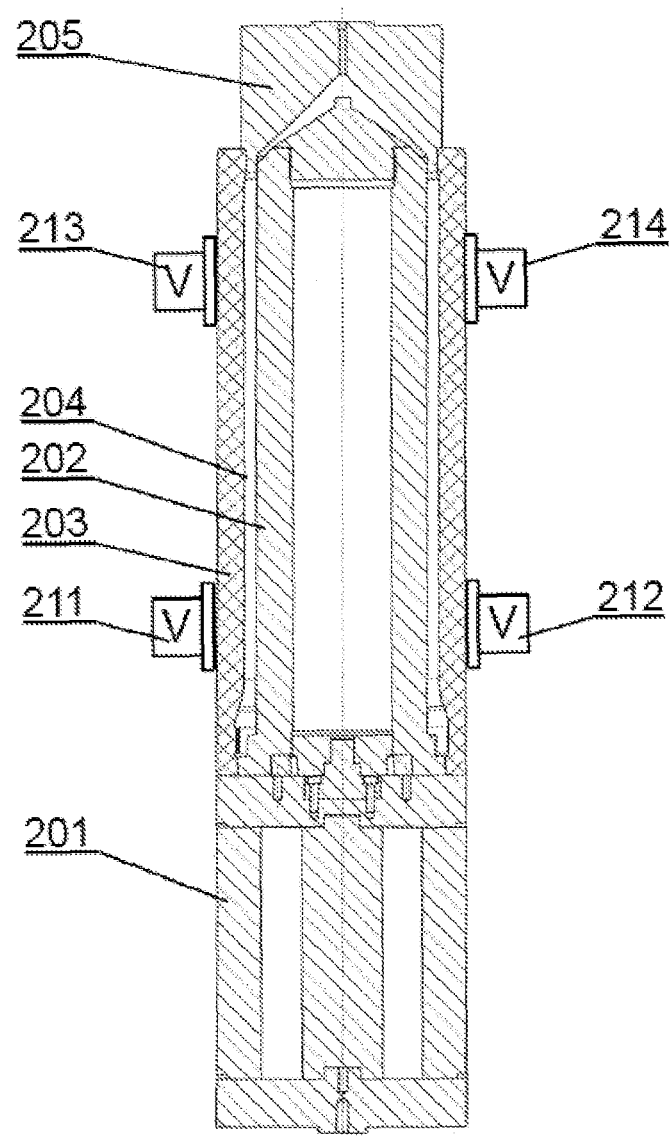
FIG. 2 presents a mould with vibrators.
Figure 3:
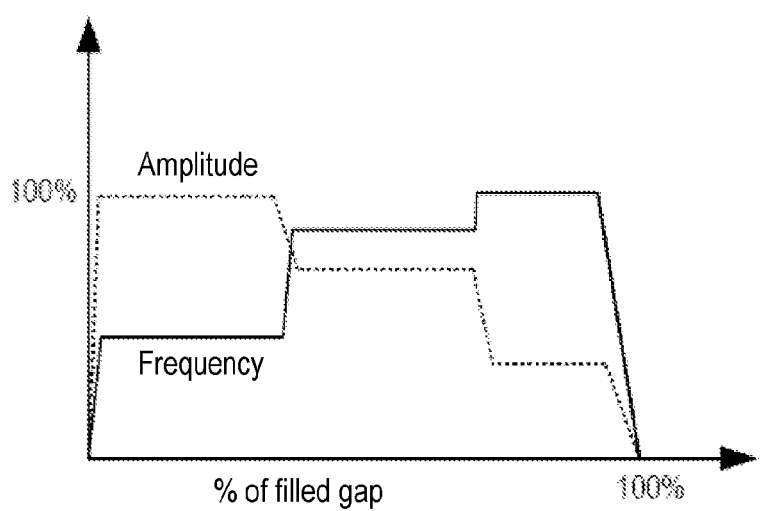
FIG. 3 presents a diagram of the operation of vibrators, taking into account the amplitude and frequency of vibrations while filling the mould.

As shown in FIG. 1, ceramic powder from a container 101 is fed in a controlled way into a mould 102 equipped with a vibration set 103, as discussed in detail in relation to FIGS. 2 and 3. The filled mould 102 is introduced to the isostatic press, where the element is moulded under high pressure of about 300-800 bar. Then, the formed element is conveyed by arms of an automated robot to a glazing station 105, in which it is glazed with the use of glazing technology of spraying, immersing or jetting. After glazing, the pipes are transported on trucks to a furnace 106 to be fired. After firing, the pipes are removed from trucks through an automated system of transportation and moved to a mechanical treatment station 107, where they can be shaped by milling, rolling, cutting, etc. Then, the shaped elements are transported to a warehouse of finished products 108.

The ceramic powder used for the production of pipe elements is a high-strength aluminium porcelain of type C-130 according to the standard ENN/12212 "Advanced technical ceramics. Unified method for classification" (ISBN 0580254925). It consists of $Al_2O_3$ from 40% to 75% by weight, $SiO_2$ from 5% to 25%, kaolin from 5% to 20% (white clay), and potters clay from 5% to 20%.

The mould of the isostatic press 102 is presented in details in FIG. 2. It contains a base 201 on which a lower punch 202 is installed. To the lower punch 202, an elastic cylindrical polyurethane membrane 203 is fitted, so that a cylindrical gap 204 between them is formed to be filled. This invention concerns manufacturing of electro-insulating ceramic pipes having outer diameter between 30 mm and 100 mm, wall thickness between a 5 mm and 10 mm, and length between 15 cm and 150 cm. When the length of the pipe is increased, the slenderness ratio (i.e. the ratio of length to the wall thickness) of the gap to be filled increases, therefore the gap 204 has to be filled precisely with the ceramic powder. At least one pair of vibrators 213-214 is positioned on the side of membrane 203, wherein the vibrators that make a pair are located opposite each other. Vibrators 211-212, 213-214 operate in such a way that they press the membrane so that its cross section is slightly deformed from a circular to an oval shape, thereby facilitating the compaction of ceramic powder while the slot 204 is filled. The operation of vibrators is divided into stages, e.g. as shown in the example in FIG. 3. When the gap 204 is filled completely, vibrators 213-214 are stopped and the mould is closed from the top with a steel upper punch 205.

Then, the filled mould 102 is transferred to the isostatic press 104, where it is pressed isostatically, i.e. the uniform pressure is exerted on the membrane 203. The operational cycle includes a first stage, in which the pressure increases linearly from zero to the range from 300 to 800 bar in time from 15 s to 20 s, then the pressure maintains on the maximum level during 1 s, and after that the pressure is reduced in time from 25 s to 35 s, to zero.

The ceramic element moulded in such way is particularly well prepared for further step of the manufacturing process, which then is carried out in a typical way. As described above, the specific process of moulding guarantees high accuracy and high quality of the formed electro-insulating pipes.

FIG. 3 presents an example of the operation of vibrators. The filling process lasts about 40 s to 50 s. In principle, the operation of vibrators is divided into at least three stages, in which the vibration frequency is increased and the amplitude of vibration is reduced in subsequent stages. The lowest frequency of vibration is between 50 Hz and 70 Hz, and the highest frequency of vibration is between 90 Hz and 110 Hz. The amplitude of vibration causes a change of the diameter of flexible membrane between vibrators, from the lowest value of about 0.5% to the highest value of about 2%.

The invention claimed is:

1. A method for manufacturing of ceramic electro-insulating pipes having an external diameter between 30 mm and 100 mm, a wall thickness between 5 mm and 10 mm, a length between 15 cm and 150 cm, the method comprising:

providing a mould comprising a rigid cylindrical lower punch and a flexible cylindrical outer membrane placed around the lower punch, wherein a cylindrical gap for ceramic powder is present between the lower punch and the flexible cylindrical outer membrane, filling the cylindrical gap of the mould with a ceramic powder consisting of $Al_2O_3$ from 40% to 75% by weight, $SiO_2$ from 5 to 25%, kaolin (white clay) from 5% to 20%, and potter's clay from 5% to 20%, the filling comprising:

deforming the outer membrane from a circular cross-section to an oval cross-section by using at least one pair of vibrators positioned on the opposite sides of the membrane;

operating the vibrators in at least three stages, by increasing the vibration frequency increases and decreasing the amplitude of vibration between successive stages, wherein the lowest vibration frequency is between 50 Hz and 70 Hz, and the highest vibration frequency is between 90 Hz and 110 Hz, and wherein the vibration amplitude is selected to cause a reduction of the diameter of membrane between the vibrators from a lowest value of substantially 0.5% to a highest value of substantially 2%, compacting the filled mould in an isostatic press to obtain a compacted element, comprising pressing the mould isostatically:

in a first cycle that lasts from 15 s to 25 s, in which the pressure is linearly increased from 1 bar up to a value between 300 bar and 800 bar, a second cycle which lasts substantially 1 s, in which the pressure is maintained at the level reached so far, and in a third cycle that lasts from 25 s to 35 s, wherein the pressure is reduced linearly to 1 bar, to form an element having a porosity of below 20%, glazing the compacted element to obtain a glazed element, firing the glazed element in a furnace to obtain a fired element, and shaping the fired element to the shape of the ceramic insulating pipe.

* * * * *